(12) United States Patent
Haluzak et al.

(10) Patent No.: US 7,320,899 B2
(45) Date of Patent: Jan. 22, 2008

(54) MICRO-DISPLAYS AND THEIR MANUFACTURE

(75) Inventors: Charles C Haluzak, Corvallis, OR (US); Kenneth Faase, Corvallis, OR (US); John R Sterner, Albany, OR (US); Chien-Hua Chen, Corvallis, OR (US); Kirby Sand, Corvallis, OR (US); Bao-Sung Bruce Yeh, Corvallis, OR (US); Michael J. Regan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 10/977,278

(22) Filed: Oct. 29, 2004

(65) Prior Publication Data

US 2006/0094143 A1 May 4, 2006

Related U.S. Application Data

(60) Provisional application No. 60/621,176, filed on Oct. 21, 2004.

(51) Int. Cl.
*H01L 21/00* (2006.01)
*G02B 26/08* (2006.01)

(52) U.S. Cl. .................. 438/31; 257/432; 257/E21.499; 359/223

(58) Field of Classification Search .................. 438/31; 257/432, E21.499; 359/223
See application file for complete search history.

(56) References Cited

U.S. PATENT DOCUMENTS

| | | | |
|---|---|---|---|
| 5,652,671 A * | 7/1997 | Knipe et al. ................. | 359/291 |
| 5,658,698 A | 8/1997 | Yagi et al. | |
| 6,123,985 A | 9/2000 | Robinson et al. | |
| 6,438,282 B1 * | 8/2002 | Takeda et al. ................ | 385/16 |
| 6,738,538 B2 | 5/2004 | Antaki et al. | |
| 7,109,066 B2 * | 9/2006 | Yang .......................... | 438/125 |
| 2004/0012838 A1 * | 1/2004 | Huibers ....................... | 359/291 |
| 2004/0156089 A1 * | 8/2004 | Doan et al. .................. | 359/291 |
| 2005/0099670 A1 * | 5/2005 | Kimura et al. .............. | 359/291 |
| 2005/0275930 A1 * | 12/2005 | Patel et al. .................. | 359/291 |

* cited by examiner

*Primary Examiner*—B. William Baumeister
*Assistant Examiner*—Steven J. Fulk

(57) ABSTRACT

A method of forming a micro-display includes forming a device that includes forming a partially reflecting layer on a first substrate and forming a plate overlying the partially reflecting layer, and adhering the device to a second substrate.

23 Claims, 9 Drawing Sheets

MICRO-DISPLAYS AND THEIR MANUFACTURE

CLAIM OF PRIORITY

This application claims the benefit of U.S. Provisional Application No. 60/621,176, filed on Oct. 21, 2004, entitled MICRO-DISPLAYS AND THEIR MANUFACTURE, and having express mail label number EL871865948 US.

BACKGROUND

Digital projectors often include micro-displays that include arrays of pixels (e.g., 1280×1024, etc.) Each pixel usually includes a micro-electromechanical system (MEMS) device, such as a micro-mirror, liquid crystal on silicon (LcoS) device, interference-based modulator, etc. A micro-display is used with a light source and projection lens of the digital projector. The micro-display receives light from the light source. When the pixels of the micro-display are ON, the pixels direct the light to the projection lens. When the pixels are OFF, they direct the light from the light source away from the projection lens. The projection lens images and magnifies the micro-display.

Micro-displays are usually formed using semiconductor-processing methods that include forming electronic driver circuits on a semiconductor substrate for driving the MEMS devices of the pixels. The electronic driver circuits are often Complementary Metal Oxide Semiconductor (CMOS) devices. After forming the electronic driver circuits, the MEMS devices are formed overlying the electronic driver circuits and a transparent, e.g., glass, cover is formed overlying the MEMS devices for packaging, e.g., sealing and/or protecting, the MEMS devices and the electronic driver circuits.

DETAILED DESCRIPTION

In the following detailed description of the present embodiments, reference is made to the accompanying drawings that form a part hereof, and in which is shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
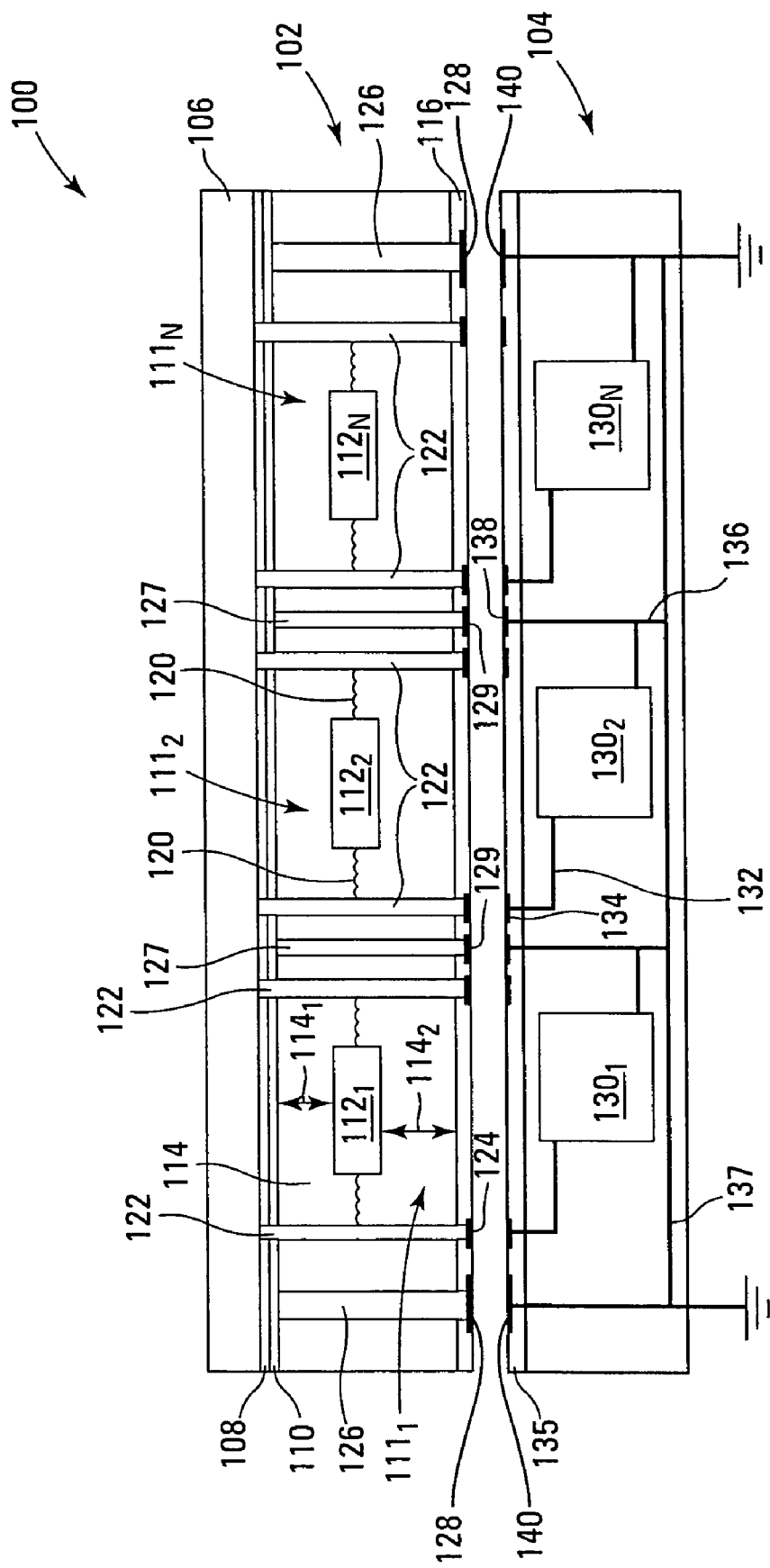
FIG. 1 is a schematic of an embodiment of a micro-display, according to an embodiment of the disclosure.

FIG. 1 is a schematic of a micro-display 100, e.g., as a portion of a digital projector, according to an embodiment. For one embodiment, micro-display 100 functions as a light modulator of the digital projector. For another embodiment, micro-display 100 includes a device 102 and a driver 104. For some embodiments, device 102 includes one or more micro-electromechanical system (MEMS) devices 111, such as micro-mirrors, liquid crystal on silicon (LcoS) devices, interference-based modulators, etc. For other embodiments, device 102 and driver 104 are formed separately and are subsequently bonded together.

For one embodiment, device 102 includes a substrate 106, such as a transparent cover, e.g., of glass. For another embodiment, a transparent layer 108, e.g., of TEOS (tetraethylorthosilicate) oxide, silicon oxide, etc., is formed on substrate 106. A partially reflecting layer 110, e.g., a tantalum-aluminum (TaAl) layer, is formed on transparent layer 108. For other embodiments, partially reflecting layer 110 may be formed directly on substrate 106. For other embodiments, partially reflecting layer 110 forms a first capacitor plate of device 102.

Device 102 also includes pixel plates 112, e.g., as a portion of the MEMS devices 111, that are suspended by flexures 120 within a gap 114 located between partially reflecting layer 110 and a protective layer 116, e.g., of TEOS (tetraethylorthosilicate) oxide, silicon oxide, etc. Specifically, a first gap portion 114, of gap 114 separates a pixel plate 112 from partially reflecting layer 110, and a second gap portion $114_2$ of gap 114 separates a pixel plate 112 from protective layer 116. For one embodiment, pixel plates 112 form second capacitor plates of device 102.

Flexures 120 electrically connect their respective pixel plates to one or more signal posts 122 that terminate at signal contacts 124 formed on protective layer 116. For one embodiment, pixel plates 112 are of a aluminum-copper (AlCu) alloy that acts like a mirror. For another embodiment, pixel plates 112 include a layer of TaAl formed on a layer of AlCu, where the AlCu layer faces partially reflecting layer 110.

For one embodiment, a bond ring 126 is electrically connected to partially reflecting layer 110 and terminates at ground contacts 128 formed on protective layer 116. For some embodiments, bond ring 126 also provides support between substrate 106 and protective layer 116. For another embodiment, ground posts 127 are also electrically connected to partially reflecting layer 110 and terminate at ground contacts 129 formed on protective layer 116. Ground posts 127 may also provide support between substrate 106 and protective layer 116, for some embodiments.

For one embodiment, driver 104 is Complementary Metal Oxide Semiconductor (CMOS) substrate. Driver 104 can be formed using semiconductor-processing methods known to those skilled in the art. Driver 104 includes driver circuits 130 adapted to respectively control the positions of pixel plates 112 and thus the corresponding gaps 114. Each of driver circuits 130 is connected between a signal supply line 132 and a ground line 136. Signal supply line 132 terminates at a signal contact 134 formed in a protective layer 135, e.g., of TEOS (tetraethylorthosilicate) oxide, silicon oxide, etc. Ground line 136 is connected between a main ground line 137 and a ground contact 138 formed in protective layer 135.

Driver 104 is electrically connected to device 102, for one embodiment, by bonding ground contacts 129 to ground contacts 138 to connect ground posts 127, and thus partially reflecting layer 110, to ground, and by bonding signal contacts 124 to signal contacts 134 to connect driver circuits 130 to signal posts 122 and thus to pixel plates 112. For another embodiment, main ground line 137 may also be separately connected to ground contacts 128 by bonding ground contacts 128 to ground contacts 140 formed in protective layer 135 and connected to main ground line 137. This connects seal ring 126, and thus further connects partially reflecting layer 110, to ground. For another embodiment, the contacts may be soldered together. For other embodiments, protective layers 116 and 135 are bonded together using plasma-enhanced bonding so that the contacts abut each other.

For another embodiment, ground posts 127 and/or bond ring 126, signal posts 122, pixel plates 112, and flexures 120 are formed as a part of driver 104 using semiconductor-processing methods. For this embodiment, partially reflecting layer 110 is formed on substrate 106, e.g., by chemical vapor deposition. Partially reflecting layer 110 is then bonded, e.g., by gluing, plasma-enhanced bonding, or the like, to ground posts 127 and/or bond ring 126. This acts to reduce the number of processing steps compared to where transparent layer 108 is disposed on the substrate 106 prior to partially reflecting layer 110, as discussed above and shown in FIG. 1.

In operation, driver circuits 130 respectively send signals via signal lines 132, signal posts 122, and flexures 120 to pixel plates 112. This creates potentials between partially reflecting layer 110 and the respective pixel plates 112 that deflect the respective pixel plates 112 and thus change the corresponding gap portions $114_1$.

Light, e.g., from a light source of a projector, passes through substrate 106 and through transparent layer 108. Partially reflecting plate 110 passes a portion of the light onto pixel plates 112 and reflects a portion of the light back through transparent layer 108 and substrate 106. The pixel plates 112 reflect the light back to partially reflecting plate 110, which passes some of the light through transparent layer 108 and substrate 106 and reflects a portion of the light back to pixel plates 112 and the process repeats. That is, multiple reflections occur between the pixel plates 112 and partially reflecting layer 110, with some of the reflected light passing through partially reflecting layer 110 and through substrate 106. This produces optical interference that can be tuned using the gap portions $114_1$.

Figure 2A:
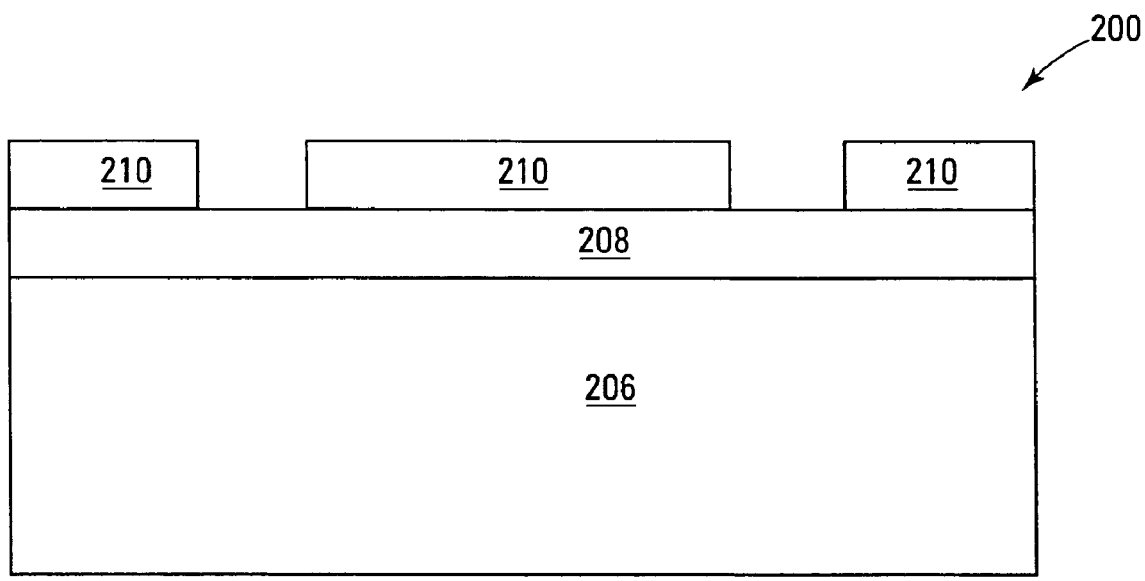
FIGS. 2A-2L are cross-sections of a portion of an embodiment of a micro display at various stages of fabrication, according to another embodiment of the disclosure.
Figure 2B:
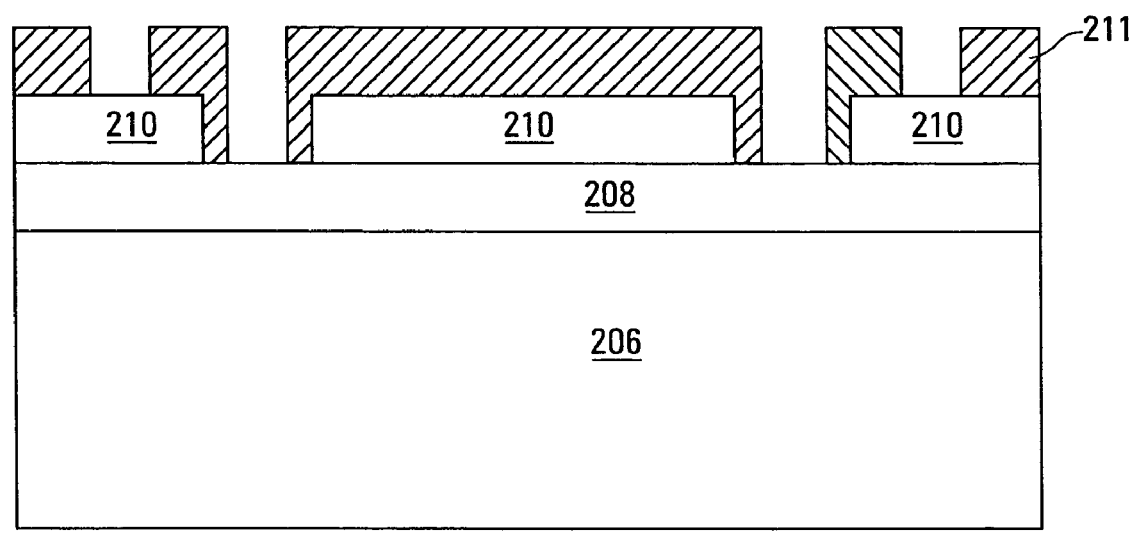

FIGS. 2A-2L are cross-sections of a portion of a device 200 at various stages of fabrication, according to another embodiment. The device 200 includes a first substrate 206, such as an insulator, transparent cover, e.g., of glass, etc., as shown in FIG. 2A. For one embodiment, a transparent layer 208 is formed on first substrate 206 and a partially reflecting layer 210 is formed on transparent layer 208 and is patterned and etched to expose portions of transparent layer 208. For another embodiment, partially reflecting layer 210 is formed directly on first substrate 206. In FIG. 2B, a first sacrificial layer 211 (distinguished by cross-hatching) is formed on partially reflecting layer 210 and for one embodiment is patterned and etched to expose the exposed portions of transparent layer 208 and portions of partially reflecting layer 210. For one embodiment, the first sacrificial layer 211 may be smoothed and/or flattened prior to patterning and etching using chemical mechanical polishing (CMP). The first sacrificial layer 211 will form a portion of a gap, such as a gap portion $114_1$ of FIG. 1, between a pixel plate, such as a pixel plate 112 of FIG. 1, and partially reflecting layer 210.

Figure 2C:
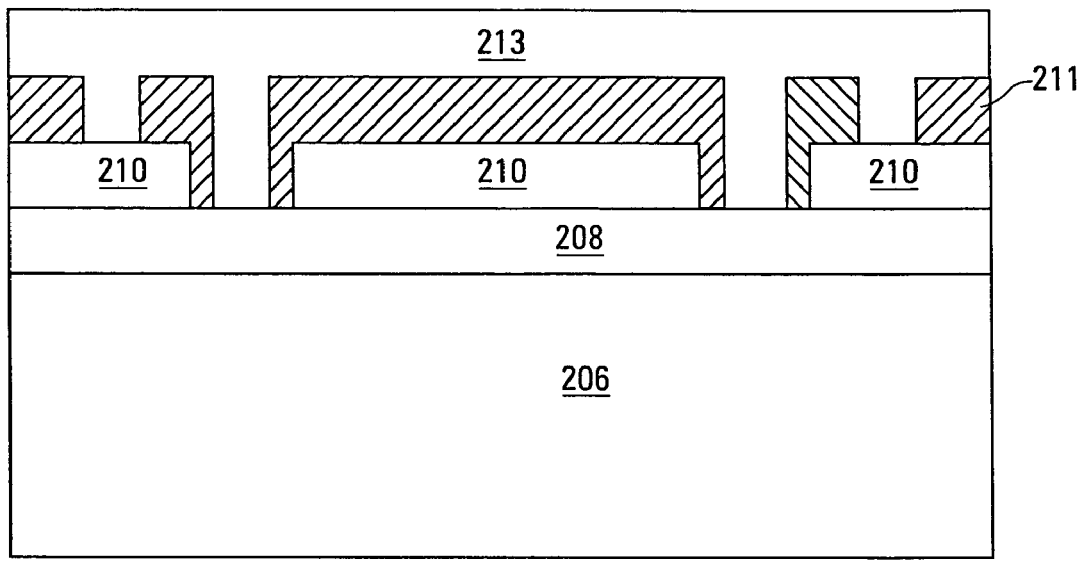
Figure 2D:
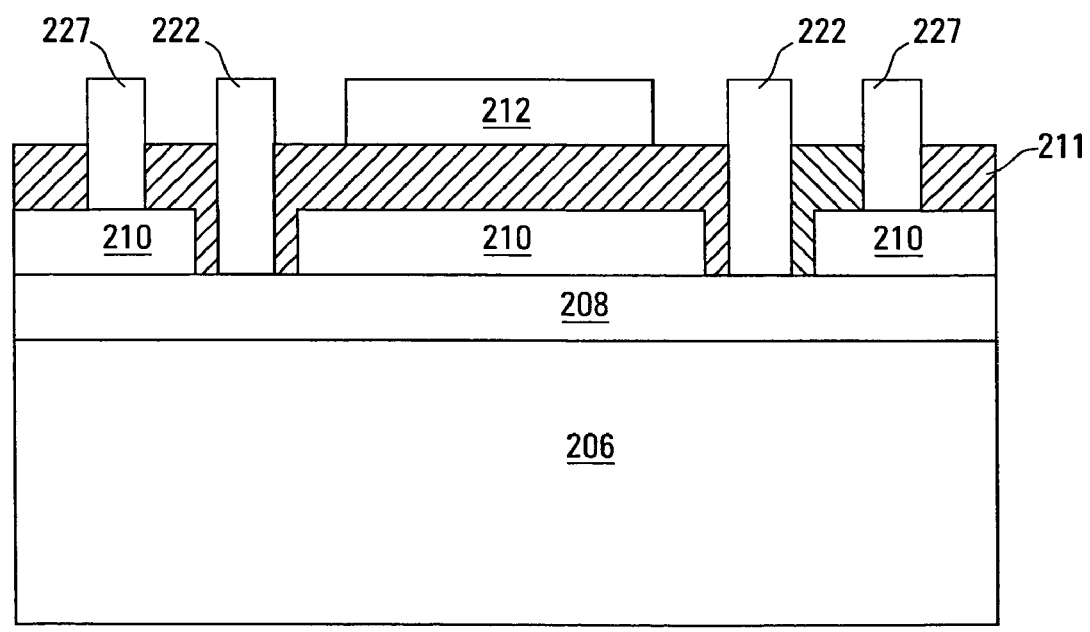

A first metal layer 213, e.g., a layer of TaAl or a layer of TaAl formed on a layer of AlCu is formed on the first sacrificial layer 211 and on the exposed portions of transparent layer 208 and partially reflecting layer 210 in FIG. 2C. The first metal layer 213 is patterned and etched to define a pixel plate 212, first portions of ground posts 227, and signal posts 222 and to expose portions of the first sacrificial layer 211 in FIG. 2D. Note that the pixel plate 212 contacts the sacrificial layer 211, the ground posts 227 contact the exposed portions of partially reflecting layer 210, and the signal posts 222 contact transparent layer 208, or for embodiments without transparent layer 208, first substrate 206.

Figure 2E:
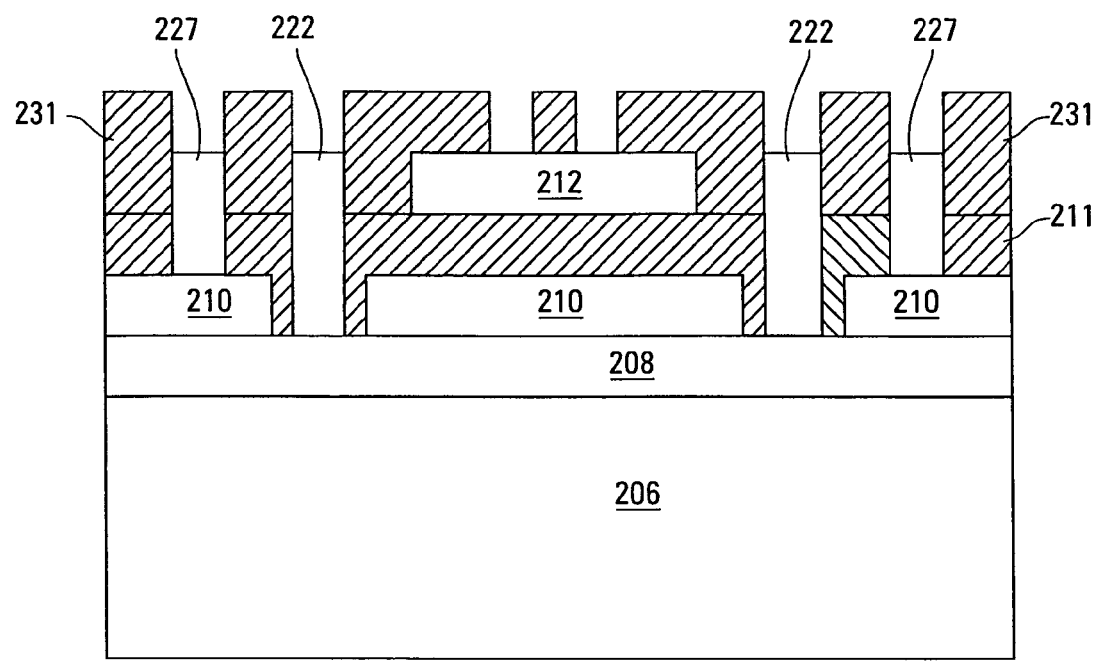

A second sacrificial layer 231 (distinguished by cross-hatching) is formed on the first metal layer 213, i.e., on pixel plate 212, ground posts 227, and signal posts 222, and on the exposed portions of the first sacrificial layer 211 in FIG. 2E. The second sacrificial layer 231 is patterned and etched to expose portions of pixel plate 212 and to expose ground posts 227 and signal posts 222. For one embodiment, the second sacrificial layer 231 may be smoothed and/or flattened prior to patterning and etching using CMP.

Figure 2F:
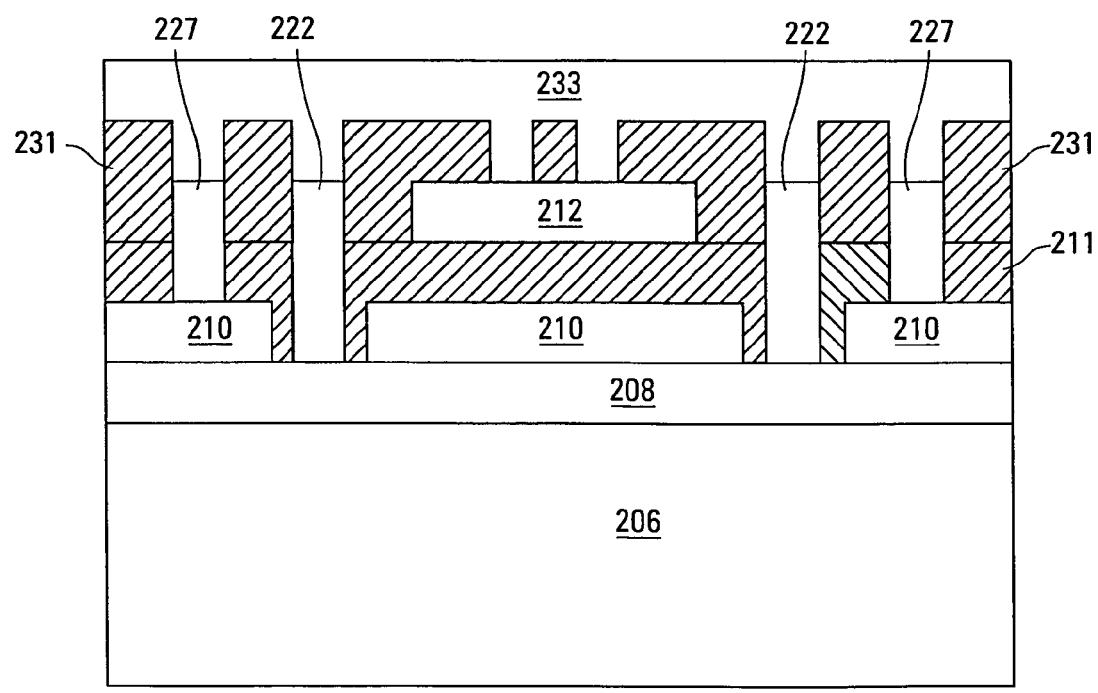
Figure 2G:
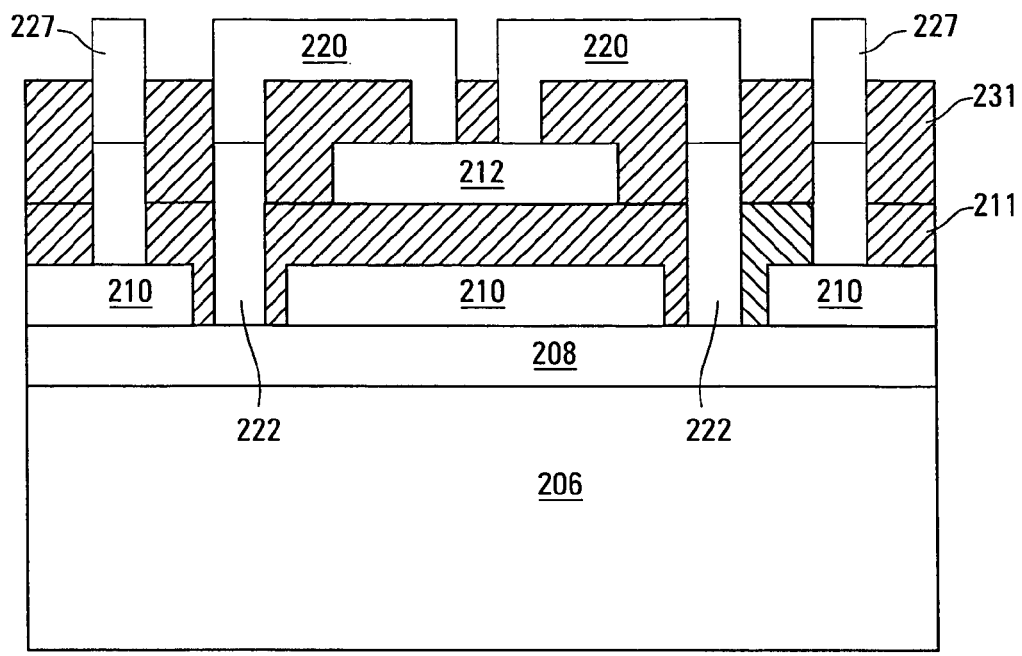

A second metal layer 233, e.g., of TaAl, is formed on the second sacrificial layer 231, on the exposed portions of pixel plate 212, and on the exposed ground posts 227 and signal posts 222 in FIG. 2F. The second metal layer 233 is patterned and etched to form flexures 220 and second portions of ground posts 227 and to expose portions of the second sacrificial layer 231 in FIG. 2G. Note that flexures 220 electrically and physically connect signal posts 222 to the exposed portions of pixel plate 212. Note further that flexures 220 directly overlie pixel plate 212, meaning that when the device 200 is inverted and connected to a second substrate, such as driver 104, as shown in FIG. 1, flexures 220 will be located under the pixel plate 212. That is, flexures 220 are aligned behind pixel plate 212 so that pixel plate 212 obstructs flexures 220 from being viewed through cover 206. This helps to conserve device real estate.

Figure 2H:
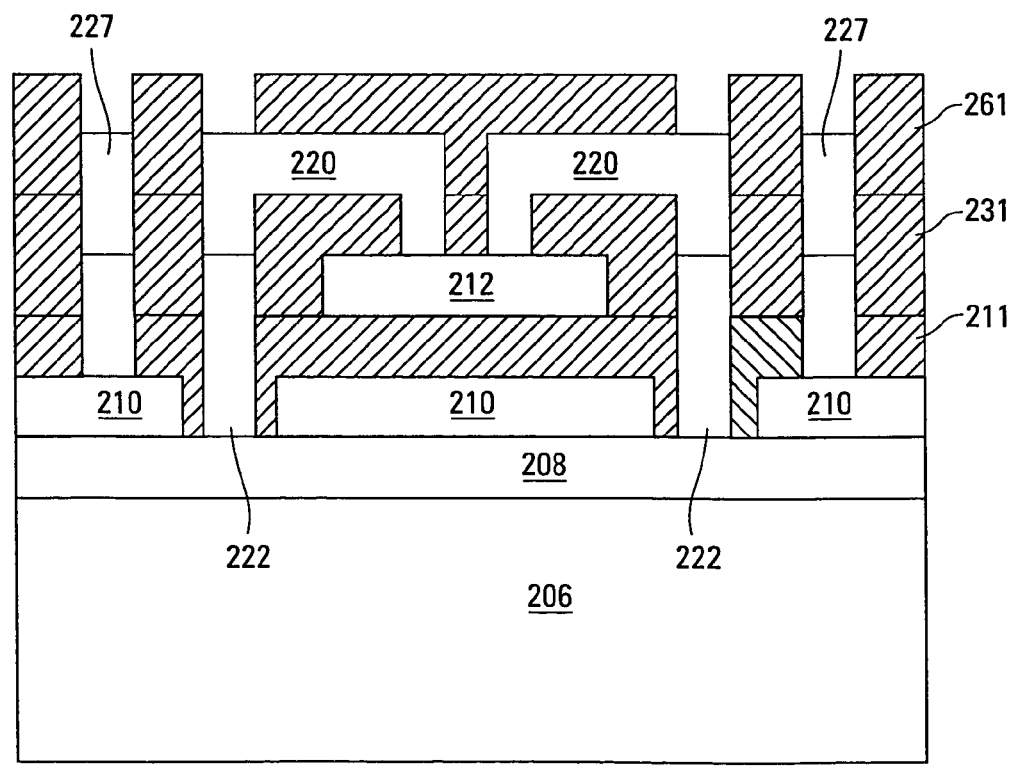
Figure 2I:
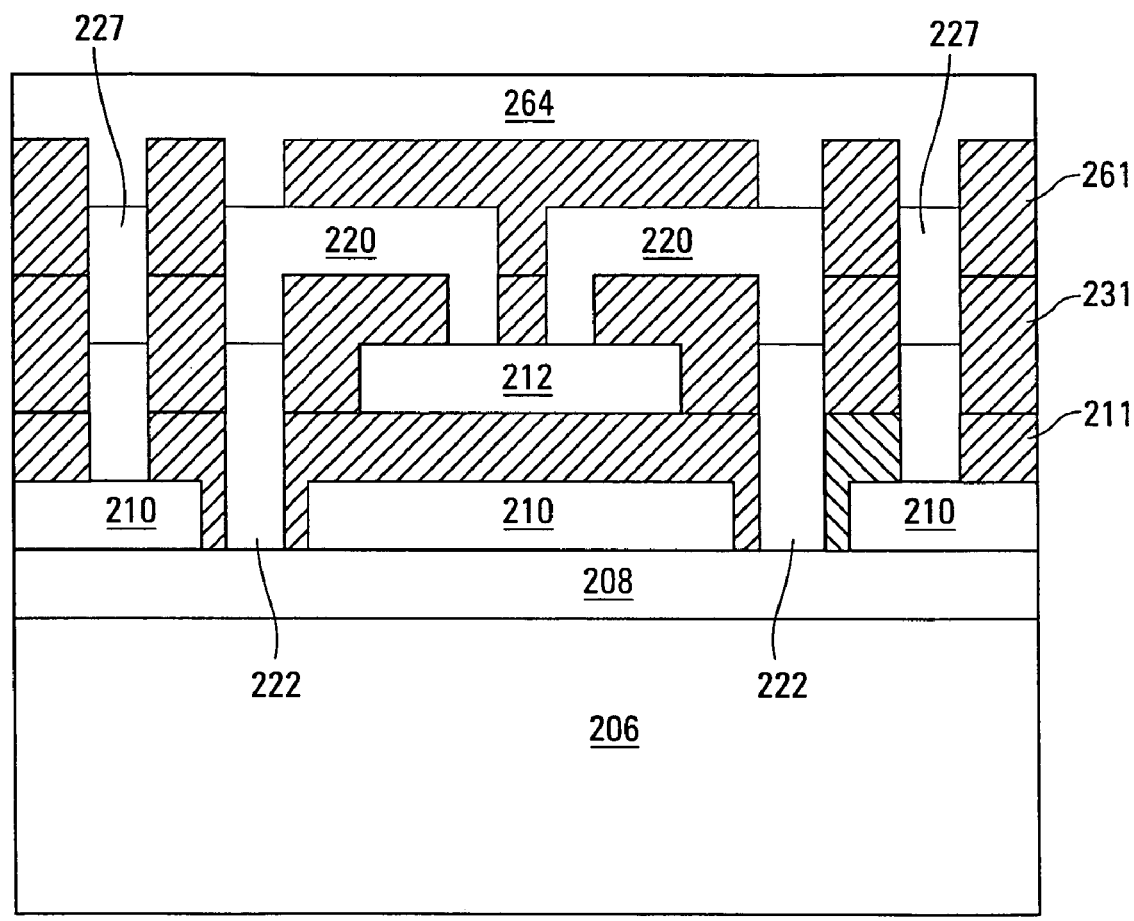
Figure 2J:
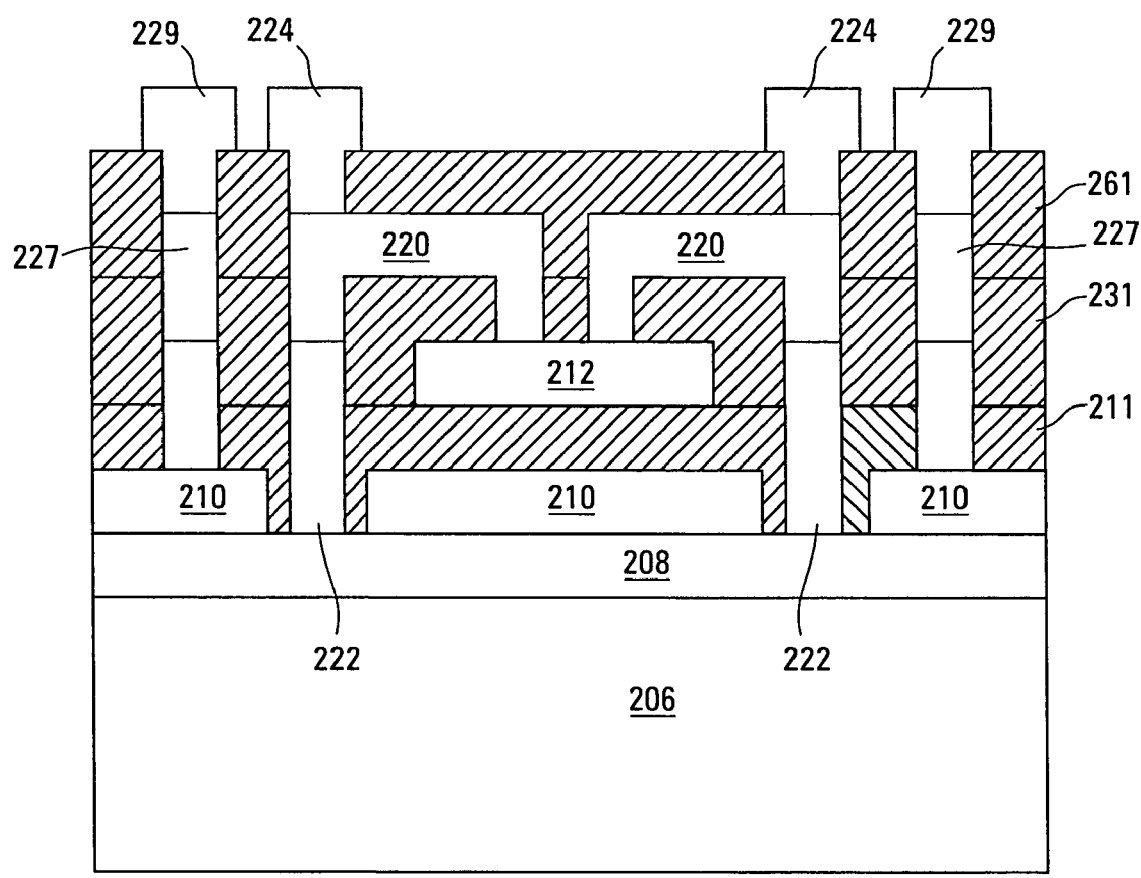

A third sacrificial layer 261 (distinguished by cross-hatching) is formed on flexures 220, ground posts 227, and the exposed portions of the second sacrificial layer 231 and is patterned and etched to expose portions of flexures 220 and ground posts 227 in FIG. 2H. For one embodiment, the third sacrificial layer 261 may be smoothed and/or flattened prior to patterning and etching using CMP. A third metal layer 264, e.g., AlCu, TaAl, or the like, is formed on the third sacrificial layer 261 and on the exposed portions of flexures 220 and on ground posts 227 in FIG. 2I. The third metal layer 264 is patterned and etched to form ground contacts 229 in physical and electrical contact with ground posts 227 and signal contacts 224 in physical and electrical contact with flexures 220 and to expose portions of the third sacrificial layer 261 in FIG. 2J. Alternatively, for another embodiment, CMP forms the ground contacts 229.

Figure 2K:
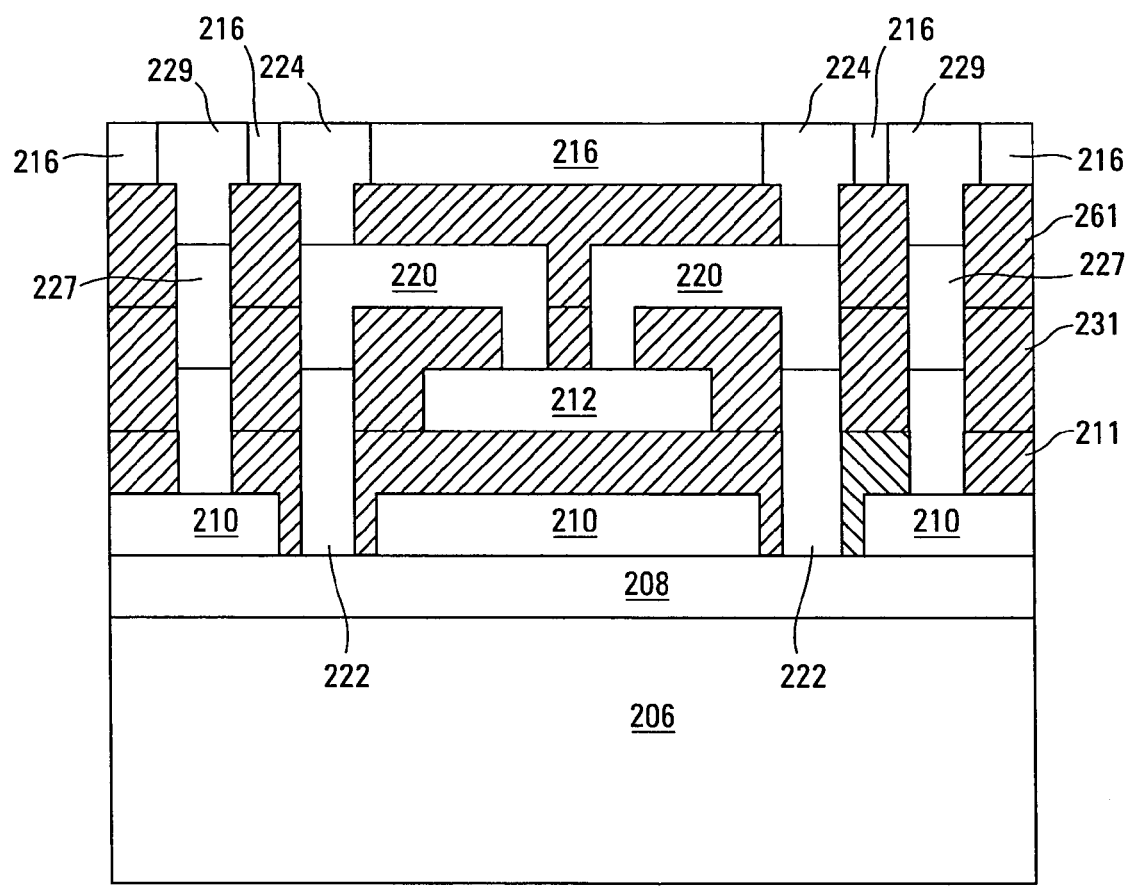

A protective layer 216, e.g., of TEOS (tetraethylorthosilicate) oxide, silicon oxide, etc., is formed on the exposed portions of the third sacrificial layer 261 and on ground contacts 229 and signal contacts 224 and is patterned and etched to expose portions of the third sacrificial layer 261 and ground contacts 229 and signal contacts 224 in FIG. 2K. For one embodiment, CMP follows patterning and etching to smooth and flatten protective layer 216 and ground contacts 229 and signal contacts 224 so that ground contacts 229 and signal contacts 224 are substantially flush with protective layer 216. For another embodiment, CMP may be used to expose the portions of the third sacrificial layer 261 and ground contacts 229 and signal contacts 224.

Figure 2L:
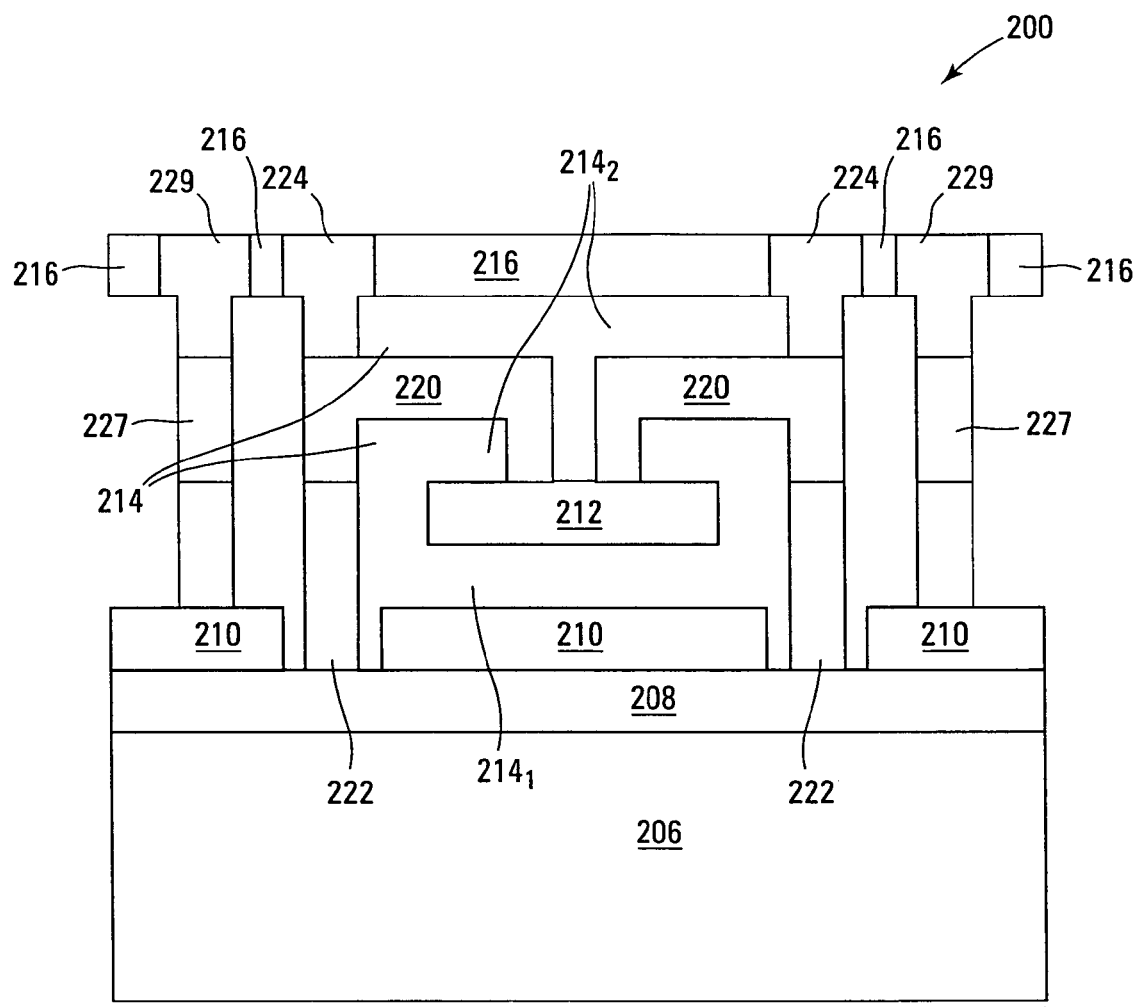

The first sacrificial layer 211, the second sacrificial layer 231, and the third sacrificial layer 261 are removed in FIG. 2L to form the portion of the device 200 that includes a gap 214, as indicated by removal of the cross-hatching. Gap 214 contains pixel plate 212 and flexures 220. Note that removal of the first sacrificial layer 211 forms a first gap portion $214_1$ between pixel plate 212 and partially reflecting layer 210. Removal of the second sacrificial layer 231 and the third sacrificial layer 261 forms a second gap portion $214_2$ between pixel plate 212 and protective layer 216. Note that flexures 220 are contained within the second gap portion $214_2$. Flexures 220 support pixel plate 212 within gap 214 and provide a restoring force against which pixel plate 212 returns from an electrostatic actuation driving force applied to pixel plate 212 for some embodiments.

The device is inverted and bonded to the second substrate, such as driver 104 of FIG. 1. This electrically connects signal contacts 224 to a signal line of the second substrate, such as a signal line 132 of a driver circuit 130 of driver 104. Ground contacts 229 are connected to a ground line of the second substrate, such as ground line 136 of driver 104. Note that partially reflecting layer 210 is at a ground state and acts as a first capacitor plate. When electrical signals are applied to pixel plate 212, via signal contacts 224 and flexures 220, pixel plate 212 acts as a second capacitor plate and moves within gap 214 against the restoring force provided by flexures 220. This regulates the size of gap portion $214_1$.

It will be appreciated that the bond ring 126 of device 102 of FIG. 1 may be formed, for one embodiment, as described above for ground posts 227.

CONCLUSION

Although specific embodiments have been illustrated and described herein it is manifestly intended that the scope of the claimed subject matter be limited only by the following claims and equivalents thereof.

What is claimed is:

1. A method of forming a micro-display, comprising:
   forming a device, wherein forming the device comprises:
      forming a partially reflecting layer on a cover of the micro-display, the cover being transparent to visible light, wherein the partially reflecting layer forms a first capacitor plate of the device;
      forming a first sacrificial layer overlying and in direct contact with the partially reflecting layer;
      forming a reflective second capacitor plate overlying and in direct contact with the first sacrificial layer so that the first sacrificial layer is interposed between the second capacitor plate and the partially reflecting layer;
      forming a second sacrificial layer overlying and in direct contact with the second capacitor plate;
      removing the first sacrificial layer to form a first portion of a gap that is interposed between the partially reflecting layer and the second capacitor plate; and
      removing the second sacrificial layer to form a second portion of the gap overlying the second capacitor plate; and
   adhering the device to a second substrate.

2. The method of claim 1, wherein adhering the device to a second substrate further comprises electrically connecting the second capacitor plate to the second substrate.

3. The method of claim 1, wherein forming a partially reflecting layer on a first substrate further comprises forming the partially reflecting layer in direct contact with the first substrate.

4. The method of claim 1 further comprises suspending the second capacitor plate within a gap by a flexure.

5. The method of claim 4, wherein the flexure is located directly behind the second capacitor plate relative to the first substrate.

6. The method of claim 1 further comprises forming a protective layer overlying the second sacrificial layer so that the second portion of the gap separates the second capacitor plate from the protective layer when the second sacrificial layer is removed.

7. The method of claim 6, wherein adhering the device to the second substrate comprises adhering the protective layer to the second substrate.

8. The method of claim 1, wherein the second portion of the gap separates the second capacitor plate from the second substrate.

9. The method of claim 1, wherein the second substrate includes a Complementary Metal Oxide Semiconductor.

10. The method of claim 1, wherein the second capacitor plate is a mirror.

11. The method of claim 1 further comprises inverting the device before adhering the device to the second substrate.

12. The method of claim 1, wherein adhering the device to a second substrate comprises plasma-enhanced bonding.

13. The method of claim 1, wherein the second substrate comprises a driver circuit for driving the second capacitor plate.

14. A method of forming a micro-display, comprising:
   forming a device, wherein forming the device comprises:
      forming a transparent layer on a cover of the micro-display so that the transparent layer is in direct contact with the transparent cover of the micro-display, the cover being transparent to visible light;
      forming a partially reflecting layer overlying and in direct contact with the transparent layer, wherein the partially reflecting layer forms a first capacitor plate of the device;
      forming a sacrificial layer overlying and in direct contact with the first capacitor plate;
      forming a reflective plate overlying and in direct contact with the sacrificial layer, wherein the reflective plate forms a second capacitor plate of the device, wherein the sacrificial layer is interposed between the reflective plate and the partially reflecting layer;
      removing the sacrificial layer to form a first gap portion interposed between the reflective plate and the partially reflecting layer;
      forming a protective layer overlying the reflective plate having one or more signal contacts that extend through the protective layer;
      forming a second gap portion between the reflective plate and the protective layer; and
      disposing one or more flexures within the second gap portion and physically and electrically connecting the one or more flexures between the one or more signal contacts and the reflective plate; and
   adhering the device to a driver so that the one or more signal contacts are connected to a signal line of a driver circuit of the semiconductor driver wafer.

15. The method of claim 14 further comprises forming one or more signal posts that extend from the partially reflecting layer to the one or more signal contacts.

16. The method of claim 14, wherein adhering the device to the driver connects one or more ground contacts that extend through the protective layer to a ground line within the driver.

17. The method of claim 14, wherein forming a second gap portion between the reflective plate and the protective layer comprises removing another sacrificial layer from between the reflective plate and the protective layer.

18. A micro-display comprising:
   a device, comprising:
      a cover that is transparent to visible light;
      a transparent layer underlying and direct contact with the cover;

a partially reflecting layer underlying and direct contact with the transparent layer, wherein the partially reflecting layer forms a first capacitor plate of the device;

a protective layer underlying the transparent layer and separated therefrom by a gap;

a reflective plate suspended within the gap by a flexure, wherein the reflective plate forms a second capacitor plate of the device; and a semiconductor substrate bonded to the device;

wherein the reflective plate is configured to reflect light from the partially reflecting layer back to the partially reflecting layer.

19. The micro-display of claim 18, wherein the substrate comprises a driver circuit for driving the reflective plate.

20. The micro-display of claim 18, wherein the flexure is electrically connected between a driver circuit of the substrate and the plate and the partially reflecting layer is electrically connected to a ground line of the substrate.

21. A micro-display comprising:

a device, comprising:

a transparent glass cover that can pass visible light therethrough;

a partially reflecting layer formed on the cover;

a protective layer underlying the transparent layer and separated therefrom by a gap;

a reflective plate suspended within the gap by a flexure; and a semiconductor substrate bonded to the device;

wherein the flexure is electrically connected between a driver circuit of the substrate and the plate and the partially reflecting layer is electrically connected to a ground line of the semiconductor driver wafer; and wherein the reflective plate is configured to reflect light from the partially reflecting layer back to the partially reflecting layer.

22. A micro-display comprising:

a means for passing and reflecting light formed directly on a transparent cover of the micro-display;

a means for reflecting the light from the light passing and reflecting means back to the light passing and reflecting means so that the light passing and reflecting means can pass a portion of the light through the cover and reflect another portion of the light back to the light reflecting means to produce multiple reflections between the light passing and reflecting means and the light reflecting means, wherein the multiple reflections between the light passing and reflecting means and the light reflecting means produce an optical interference; and a means for electrically driving the light reflecting means, the electrically driving means bonded to the light passing and reflecting means, wherein electrically driving the light reflecting means acts to tune the optical interference;

wherein the light passing and reflecting means is electrically coupled to the electrical driving means and the light reflecting means is electrically coupled to the electrical driving means.

23. The micro-device of claim 22 further comprises a means for providing a restoring force to the light reflecting means.

* * * * *